April 3, 1962　　F. T. ROBERTS ET AL　　3,028,289
METHOD OF MAKING FLEXIBLE REINFORCED CORRUGATED HOSE
Filed Dec. 23, 1957　　　　　　　　　　　　　　2 Sheets-Sheet 1

Fred T. Roberts,
Robert Eldon Roberts,
INVENTORS.

ATTORNEY.

April 3, 1962  F. T. ROBERTS ET AL  3,028,289
METHOD OF MAKING FLEXIBLE REINFORCED CORRUGATED HOSE
Filed Dec. 23, 1957  2 Sheets-Sheet 2
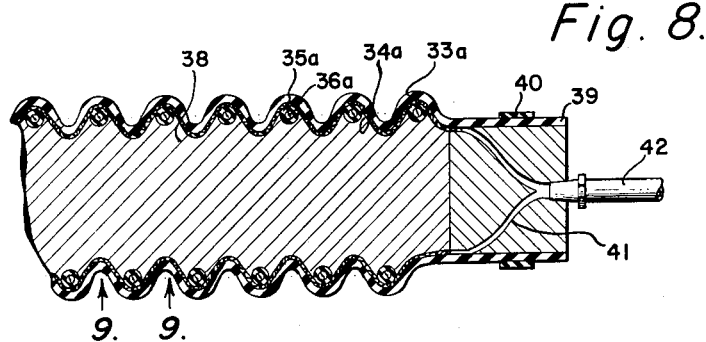
Fig. 8.
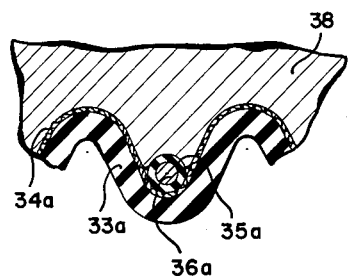
Fig. 9.
Fig. 10.
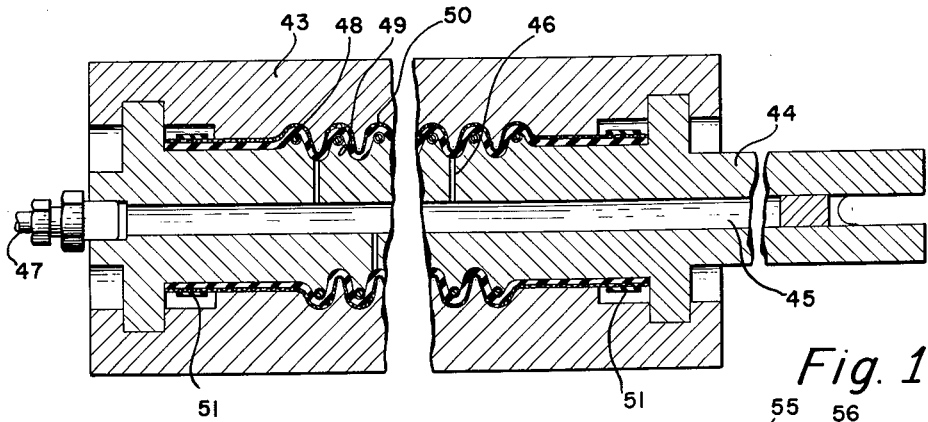
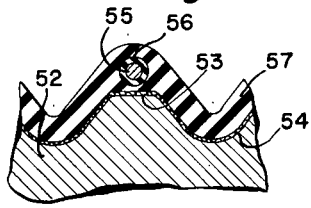
Fig. 13.
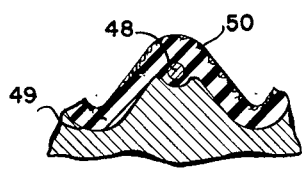
Fig. 11.
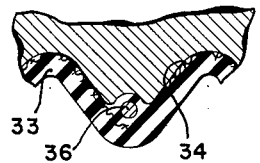
Fig. 12.
Fred T. Roberts,
Robert Eldon Roberts,
INVENTORS.
ATTORNEY.

United States Patent Office 3,028,289
Patented Apr. 3, 1962

3,028,289
METHOD OF MAKING FLEXIBLE REINFORCED CORRUGATED HOSE
Fred T. Roberts and Robert E. Roberts, both of White Fences, Danbury Road, Wilton, Conn.
Filed Dec. 23, 1957, Ser. No. 704,477
15 Claims. (Cl. 156—143)

This invention relates to a method for the manufacture of reinforced corrugated hose. It relates particularly to the manufacture of flexible, corrugated tubes, such as oxygen hose and chemical warfare hose, as well as hose suitable for use with vacuum cleaners, vehicle radiators, and the like. In general, this method relates to the manufacture of corrugated, flexible hose comprising elastomeric material in which a substantial degree of flexibility is required together with at least a certain degree of stretchability and compressibility.

This application is a continuation-in-part of our co-pending application Serial No. 594,781, filed June 29, 1956.

In accordance with the invention described and claimed in the aforementioned parent application, reinforced corrugated hose is made by utilizing a hollow grooved mandrel with additional grooves formed at the crests or corrugations of the mandrel for the positioning of the reinforcing member which is incorporated within the hose. As described in said application, a helical wire spring, which may be coated or not, is positioned at the crests of the corrugations, and a tubular elastomeric body is positioned over said reinforcements and said corrugations, then drawn around the reinforcing member and into the corrugated body of the mandrel by means of suction applied internally thereof and communicating with the surface of the tube through openings formed radially in the wall of the mandrel. The resulting assembly may then be vulcanized in open steam while continuing the application of suction to hold the assembly against the mandrel, or the mandrel may be introduced into a corrugated mold in alignment with the corrugations therein, and the mold closed, following which air or steam pressure is introduced through the openings and the assembly forced against the walls of the mold while it is being heated to cause the elastomeric material to be vulcanized and to embed the reinforcing member while conforming to the corrugations in the mold.

While the reinforced hose produced in accordance with the method described above and as described in the co-pending application referred to is generally of a highly satisfactory nature and completely suitable for many purposes, it has also been found desirable for many uses to provide a corrugated hose of similar construction, which, however, has incorporated within the wall thereof a fabric reinforcement. Such a fabric reinforcement has been found desirable primarily from the standpoint of structural reinforcement and has also been found to permit the utilization of a smaller amount of elastic material through the use of lighter gauge tubes. Additionally, the utilization of fabric reinforcement, especially in the outer surface area of the hose, has been found to provide added abrasion resistance as well as enhance appearance where such may be desired.

Accordingly, it is an object of the present invention to provide a flexible, reinforced corrugated hose having a fabric reinforcement embedded therein.

It is an additional object of the present invention to provide a fabric reinforced corrugated hose of the type described in which the fabric is embedded adjacent to the outer surface of the hose.

It is still another object of the present invention to provide a method for the manufacture of fabric reinforced hose of the type described in which the fabric is embedded adjacent the inner surface of the hose.

In accordance with the present invention, reinforcing members, which may be either of the helical or of the annular type, are positioned at the crests of the corrugations in a corrugated mandrel. A composite tubular body of unvulcanized elastomeric material, such as rubber, or the like, is preformed with a layer of fabric laminated thereto either to the inner or outer surface thereof. The preformed laminated tubular member is then positioned over the reinforcing members on the mandrel and the assembly then drawn against the mandrel by means of suction, after which the assembly is vulcanized either in open steam or by introducing it into a mold where pressure is applied internally of the assembly to cause it to conform to the mold while being heated.

Other features and advantages of the invention will be apparent from the specification and claims, but considered in connection with the accompanying drawings in which:

FIG. 8 is a longitudinal transverse cross-sectional view of a modified form of the invention utilizing a non-perforated mandrel.

FIG. 9 is an enlarged fragmentary cross-section taken along lines 9—9 of FIG. 8.

FIG. 10 is a transverse cross-sectional view illustrating the assembly of FIG. 5 on a hollow perforated mandrel introduced within a two part mold.

FIG. 11 is an enlarged cross-sectional view illustrating the wall construction of the finished product produced in accordance with the method illustrated in FIG. 10.

FIG. 12 is an enlarged cross-sectional view illustrating the wall structure of a product produced in accordance with the process illustrated in FIG. 8.

FIG. 13 is an enlarged cross-sectional view illustrating the wall construction of a hose body produced by a modified procedure.

Figure 2:
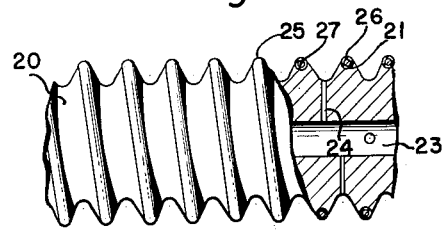
FIG. 2 is a view similar to FIG. 1 showing a helical elastomeric coated spring reinforcing member positioned on the mandrel.

Reinforced corrugated hose of the type described herein may be formed of elastomeric materials, such as natural or synthetic rubber, or elastomeric thermoplastic resins which may be molded under heat and pressure, such as polyvinyl chloride, polyethylene, polyamides, polyvinyl chloride-acetate copolymers, and the like. For the purpose of illustration, the elastomeric material described herein of which the tubular member referred to is formed is composed of a vulcanizable rubber composition. In order to obtain the improved physical characteristics and other properties referred to above, it is desired to embed a fabric layer within the inner or outer surfaces of the hose, or both. In order to obtain a product of this type in accordance with the general method and utilizing the apparatus described in the aforementioned copending application, a mandrel 20 is provided formed with corrugations defined by valley 22 and the crests 22a. The mandrel is preferably hollow having an internal passage 23, and is formed of steel, aluminum, or other suitable material, preferably metallic. The crests of the corrugations are provided with shallow grooves or recesses 21. The mandrel is provided with radially extending passages 24 which communicate between the opening in the mandrel and the valleys of the corrugations for a purpose to be described below. As shown in FIG. 2, mandrel 20 is of suitable dimensions corresponding to the desired internal diameter and length of the hose to be produced, or, if desired, the mandrel may be of sufficient length to form a plurality of lengths of hose arranged with the necessary end portions or sleeves conforming to the shape of corresponding areas on the mandrel. A reinforcing member 25 is positioned over the mandrel. This reinforcing member is preferably in the form of a wire spring previously coated with elastomeric material. The spring may be preformed with the convolutions a proper distance apart, or it may be more convenient to make the springs close coiled so that they do not tangle in storage with the coils strung together in contact. When the spring is applied over the mandrel, it is stretched to the desired distance and the coils engage the recesses in the crests and are maintained in position. Any desired degree of flexibility may be obtained in the hose by utilizing a close coiled spring and a thin-walled tube, and the compressibility and stretchability of the hose is determined, at least in part, by the depth of the corrugations and the tension of the spring. As illustrated in FIG. 2, the spring member 25 is formed of a steel wire core 27 having a coating 26 of elastomeric material. If desired, a bare wire spring may also be used, or a strip of elastomeric tape may be applied over the crests and over the grooves therein before positioning the spring.

Figure 3:
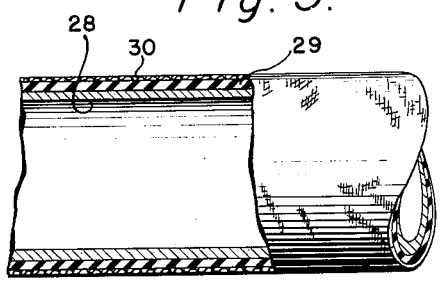
FIG. 3 is a fragmentary view partly in cross-section illustrating a laminated tube and fabric assembly utilized in forming the hose.
Figure 4:
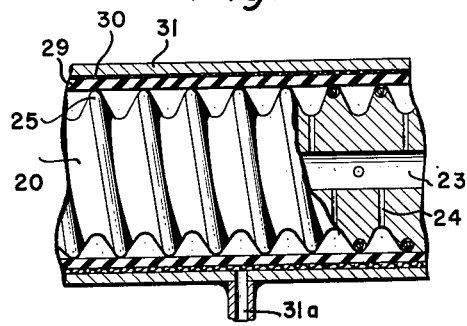
FIG. 4 is a fragmentary view partly in cross-section and partly in elevation illustrating the mandrel in position within the laminated tubular body at an intermediate stage in the production of the hose.
Figure 5:
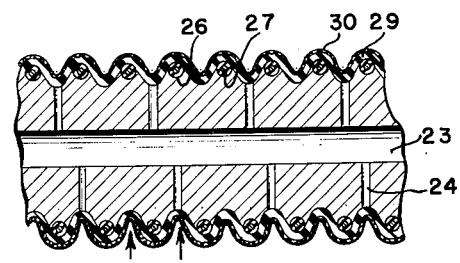
FIG. 5 is a longitudinal transverse cross-sectional view illustrating the construction of the assembly of FIG. 4 after the application of suction to the interior of the mandrel.
Figure 6:
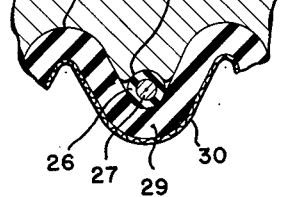
FIG. 6 is an enlarged cross-sectional view of a portion of FIG. 5 taken along lines 6—6 illustrating the structure of the assembly at the crest of a convolution.

In the next step of the process, as illustrated in FIG. 3, tube 29 of elastomeric material is formed by extrusion or otherwise, and positioned over a straight hollow mandrel 28 by drawing or blowing the tube over the mandrel. Thereupon the outer surface of the tube is coated with rubber cement, or the like, and a sleeve 30 of stretchable fabric is then drawn over the tube and allowed to become bonded thereto through the setting of the adhesive. Sleeve 30 is preferably in the form of a tubular stockinette which is of a knit or jersey type of fabric having a considerable degree of stretch. Other types of fabric may also be utilized provided a certain amount of stretch is inherent therein. Instead of utilizing a preformed tubular sleeve, the fabric may be applied in the form of tape helically wound around the tube. The resulting tube and fabric assembly is then removed from the mandrel and positioned within a tubular suction chamber of the type shown in FIG. 4. Tube 29 with its fabric layer 30 is positioned within tubular chamber 31 with the ends cuffed over the ends of the chamber. Thereupon suction is applied through conduit 31a and the walls of the tube and fabric are drawn against the inner surface of the chamber. At the same time the tube with its fabric layer is stretched to conform to the diameter of the chamber. At this poin the assembly of FIG. 2, consisting of the mandrel with the wire reinforcement positioned thereon, is inserted into the open end of the chamber and within the tube 29, as shown. A suitable type of expander of the type referred to incorporating a suction chamber is shown in Patent No. 2,560,369. After the mandrel is placed in position, the suction is removed and the tube elastically contracts into engagement with the surface of the mandrel and overlies the reinforcement means. The ends of the tube are then taped to the mandrel and suction is applied, causing the tube with its fabric outer to conform to the surface of the mandrel, as illustrated in FIG. 5. This is achieved by drawing suction through bore 23 of the mandrel and through the respective openings 24 communicating with the valleys of the corrugations on the mandrel. This results in forcing the interior surface of the tube against the mandrel and around the reinforcing members. The structure of the resulting assembly is illustrated in enlarged detail in FIG. 6 in which tubular layer 29 having fabric layer 30 bonded thereto is drawn against the valleys of the corrugations of the mandrel 22 to form troughs extending below the reinforcing member and also against the coating 26 surrounding the reinforcing member 27, and thereby firmly pressing this portion of the assembly into recess 21. The mandrel is then introduced into a heating chamber in which heat is applied while the suction is maintained in order to effect curing or vulcanization of the elastomeric material. Particularly in the case of rubber, the heating is carried out in a steam chamber in which steam under pressure surrounds the mandrel while vacuum is applied to the interior thereof. This results in the application of a considerable degree of surface pressure to the tube during vulcanization. This is carried out in a steam vulcanizer under steam pressures up to 90 p.s.i. in which the steam is at a vulcanizing temperature in the range of 250° to 350° F. which applies pressure to the external surface of the hose in conjunction with the suction which is maintained internally of the mandrel. After the hose has been molded and completely vulcanized, it can be removed from the mandrel by providing fluid pressure to the bore and expanding the hose to permit the mandrel to be removed therefrom.

Figure 7:
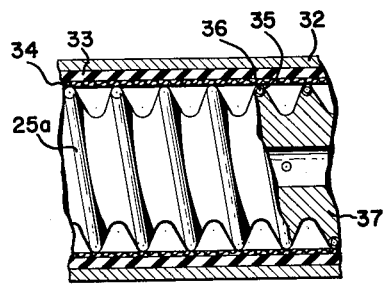
FIG. 7 is a fragmentary cross-sectional view illustrating a modified hose construction preparatory to its conformation to a mandrel similar to the structure shown in FIG. 4.

When it is desired to form a hose having an outer corrugated surface of elastomeric material and an inner reinforcing layer of fabric, this is formed in accordance with the modification illustrated in FIG. 7. This method may be carried out generally in accordance with the procedure discussed above in connection with FIGS. 1 to 6, inclusive, with the exception that the sleeve or layer 34 of fabric is first applied to the mandrel 28 in FIG. 3, following which a layer of cement is applied thereto and tube 29 drawn thereover. As illustrated in FIG. 7, the tubular assembly produced in this manner, which consists of rubber tube 33 having its interior lined with fabric layer 34, is positioned within the expanding device 32 to draw the assembly against the interior of this member, as described in connection with FIG. 4. At this point corrugated mandrel 37, which is similar to FIG. 1, having reinforcing member 25a consisting of wire 36 covered with a layer of rubber 35 positioned at the crests of the corrugations as illustrated in FIG. 2, is inserted into the expanded tube in such a manner that the rubber covering on the reinforcement is engaged by fabric layer 34 when the tube is released. At this point suction is applied to the interior of the mandrel in the manner illustrated in FIG. 5 in connection with the tube having the external layer of fabric, and the assembly is then drawn against the mandrel with the fabric layer in contact therewith. Thereupon vulcanization is effected in a vulcanizing chamber in the same manner as described in connection with the assembly of FIG. 5, the resulting product being an elastomeric surfaced corrugated hose having an interior fabric layer. Prior to vulcanization, the assembly which is drawn against the mandrel would conform substantially to that illustrated in FIG. 9. The structure of this member would correspond essentially to that illustrated in FIG. 12.

The fabric lined hose may also be made in accordance with the method illustrated in FIGS. 8 and 9. In this case a non-perforated corrugated mandrel 38 is utilized, and a preformed tubular member 33a, having a fabric liner 34a as produced in accordance with the method described, for example, in connection with FIG. 7, is positioned over the mandrel bearing the reinforcing member 35a coated with rubber 36a in the same manner. The tubular assembly comprises outer rubber layer 33a and inner fabric layer 34a assembled in the manner described above. When the suction in the expansion chamber is released, the assembly engages the corrugated mandrel, at which time the sleeves 39 are taped to the mandrel by means of rubber tape 40 and suction is applied to the mandrel through openings 41 communicating with conduit 42, which is in communication with a suction pump, or the like. Openings 41 are designed to communicate with the edge of the fabric liner at the point where the sleeve of the hose begins, as shown in the drawing. Due to the porosity and surface irregularities of the fabric at the surfaces which engage the corresponding surfaces of the mandrel, the suction will tend to draw the inner surface of the assembly against the mandrel in lieu of the radial openings illustrated in FIGS. 1, 2, 4, and 5. This assembly may then be vulcanized in a steam vulcanizer while maintaining the suction, as referred to above.

Figure 1:
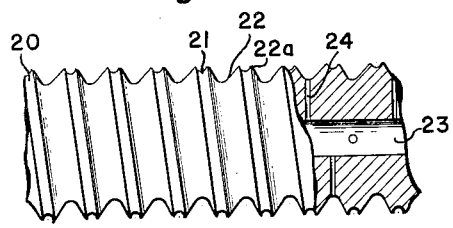
FIGURE 1 shows a fragmentary view of a mandrel partly in elevation and partly in cross-section illustrating a type of mandrel utilized in the practice of the invention.

Production of a hose of the type described herein and having a smooth exterior molded surface with a fabric reinforcing layer deeply embedded within and surrounded by the elastomeric material is illustrated in FIG. 10. In this modification a two part internally corrugated mold 43 is provided. A corrugated mandrel 44 similar to that shown in FIG. 1 is provided with an internal bore 45 and radially extending openings 46, and in which the bore communicates with the conduit 47 which in turn is in communication with a vacuum pump or other source of suction. The mandrel is first provided with the laminated rubber and fabric assembly in the manner described in FIGS. 2 to 6, inclusive, the fabric layer being positioned externally of the tube. In this way inner elastomeric tubular member 49 surrounded by fabric layer 50 is positioned over rubber coated reinforcement 48, as shown. The assembly is drawn against the mandrel by suction in the same manner which has been described above in connection with FIGS. 4 and 5. Preferably, the ends of the tube which conform to the sleeve or cuff are taped to the mandrel by means of tape 51, prior to application of the suction. The tape, which may be of rubber or fabric, is allowed to remain on during the molding operation. The mandrel with this assembly is then inserted into mold 43 and the mold closed. Preferably, the mold is slightly oversized to allow the mold to be readily closed over the assembly and to allow a slight amount of room for expansion. The mold is then inserted into a heater or between the heated platens of a hydraulic press, and air or steam pressure is then applied through conduit 47 in lieu of the previously applied suction. This fluid pressure forces the assembly to conform to the corrugations of the mold and at the same time forces some of the elastomeric material to flow through the interstices of the fabric, causing it to become completely embedded in the material of the tube. The resulting hose is smooth surfaced and contains the fabric embedded at or slightly below the surface thereof so that the surfaced appearance of the hose is no longer like that of a fabric material, but rather conforms substantially to a smooth rubber-like surface. Such a product is illustrated in FIG. 11. When it is desired that such a molded hose be obtained in which the fabric is embedded adjacent the inner surface of the tube, an assembly obtained in accordance with the method illustrated in FIG. 7 is inserted within the closed mold and pressure applied thereto. This results in a smooth molded surfaced hose conforming substantially to that illustrated in FIG. 12.

Figure 14:
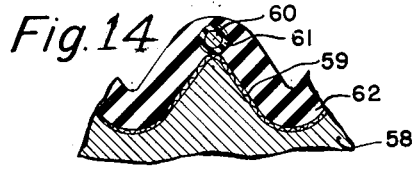
FIG. 14 is an enlarged cross-sectional view illustrating the wall construction of a hose body produced by another modified procedure.

As illustrated in FIG. 13, the fabric layer may also be applied directly over a mandrel in which the crest of the corrugation is slightly flattened resulting in a hose body having the structure shown. In this modification mandrel 52 is formed with a flattened area at the crests of the corrugations as shown at 53. Fabric 54 is then applied thereto, and reinforcement 55 covered with rubber 56 is then applied to the mandrel around said flattened areas. Rubber tube 57 is then applied and the assembly is molded as described in connection with FIGS. 7, 8, or 10. In the further modification shown in FIG. 14, a corrugated mandrel having conventionally contoured or rounded corrugations may also be used, the fabric being applied thereto as in the case of FIG. 13. The resulting product is formed on mandrel 58 with fabric layer 59 positioned thereover. Reinforcement 60 of steel wire, or the like, having rubber covering 61 is positioned over the crest of the corrugation. It is found that the fabric over the crest, plus the resilience of the covering on the wire, permits the reinforcement to be held on the crest until the fabric and reinforcement become embedded in tube 62 during vulcanization by the methods described in connection with FIGS. 7, 8, and 10.

It may be noted that when a bare wire spring or annular member is desired as the reinforcement in lieu of one which is covered with elastomeric material, equivalent results may be obtained by first applying rubber tape over the crests of the corrugations, then applying the wire spring and then the tube, whereby when molding pressure or vulcanizing pressure is applied such tape will surround the wire and become bonded and integral with the tube, thereby providing a reinforcing member which is completely surrounded by rubber. In this procedure, the resilience of the rubber tape as well as the partial embedment of the wire under tension will assist in holding the reinforcement in place, even where no trough is provided in the crest.

Although the foregoing description has referred to springs or cylindrical helical reinforcing members, the same results may be obtained by utilizing annular reinforcements positioned at the crests of annularly corrugated mandrels. Such annular reinforcements may be of wire loops or individual coils similar to those illustrated in the aforesaid copending application. Other embodiments will be obvious to those skilled in the art without departing from the spirit of the invention as set forth in the appended claims.

The inventors claim:
1. The method of making a corrugated fabric reinforced hose which comprises positioning metallic reinforcement means on a corrugated mandrel with the coils of the reinforcement means seated over the crests of the corrugations on the mandrel, preforming a composite elastomeric tubular member having a fabric reinforcing layer affixed thereto, positioning said composite tubular member over said reinforcing means on said mandrel, pressing said composite member into firm engagement with said mandrel to cause it to conform to the contours thereof and engage said reinforcing means to form troughs below the reinforcement means, and subjecting the resulting assembly to heat and pressure to cause the fabric to become embedded in the elastomeric material, and removing the resultant hose from the mandrel.

2. The method according to claim 1 wherein the assembly is introduced into a corrugated mold with the corrugations of the assembly conforming to the corrugations of the mold and wherein pressure is applied thereto to cause the tubular member to conform to the shape of the mold.

3. The method of making a corrugated flexible fabric reinforced hose which comprises positioning metallic coiled reinforcement means on a corrugated mandrel with the coiled reinforcement means seated in shallow recesses formed in the crests of the corrugations on the mandrel with portions of the reinforcement means extending beyond the surface of the mandrel, preforming a tube of elastomeric material, positioning thereover and bonding thereto a tubular layer of stretchable fabric material to form a composite tube, radially expanding and stretching said composite tube, inserting the mandrel with the reinforcement means positioned thereon into the stretched tube, releasing said stretched tube over said mandrel and reinforcement means enabling it to contract and elastically embrace the corrugated mandrel and reinforcing means thereon, pressing the elastomeric tube with its fabric layers in surface contact with the mandrel and reinforcement means to form troughs below the reinforcement means and to mold the inner surface thereof and secure the reinforcement therein, and curing the tube to set the inner molded surface and simultaneously embed the fabric therein.

4. The method of making a reinforced corrugated hose which comprises positioning metallic reinforcement means on a corrugated mandrel with the coils of the reinforcement means seated in positioning means formed in the crests of the corrugations on the mandrel to properly position the same with portions of the reinforcement means extending beyond the surface of the mandrel, preforming a tubular member comprising an assembly of a tubular body of elastomeric material having a layer of fabric positioned internally thereof and bonded to the interior surface thereof, applying said assembly around the mandrel and reinforcement means, and pressing the assembly of fabric and elastomeric material into surface contact with the mandrel and reinforcement means to form the hose with troughs disposed below the reinforcement and mold the inner surface thereof and embed the fabric therein while subjecting the assembly to heat and pressure, and removing the molded hose from the mandrel.

5. The method according to claim 4 wherein the reinforcing means is coated with a layer of elastomeric material.

6. The method of making fabric reinforced corrugated hose comprising the steps of positioning resilient reinforcement means on a corrugated mandrel with the coils of the reinforcement means positioned and held on the crests of the corrugations of the mandrel, said mandrel being hollow and having passages extending to the corrugated surface thereof, covering the corrugated mandrel with the coils of the reinforcement means positioned on the crests thereof with a composite layer of fabric and elastic material to form the body of the hose, securing the layer in an airtight manner to the mandrel beyond the corrugated portion thereof, applying suction to the mandrel to draw the layer into surface contact with the mandrel and reinforcement means to form troughs below the reinforcement means and, subjecting the mandrel with the hose thereon to heat and pressure to cure the body and to cause the reinforcement means to become permanently attached to the inner wall of the body in the crests of the corrugations thereof while simultaneously causing the fabric to become embedded within said elastic material.

7. The method according to claim 6 wherein the fabric layer is applied and bonded to the outer surface of the elastomeric layer.

8. The method according to claim 6 wherein the fabric layer is applied and bonded to the interior surface of said elastomeric layer.

9. The method according to claim 6 wherein the reinforcement means is covered with a layer of elastomeric material.

10. The method of making a reinforced corrugated hose comprising the steps of positioning a helical wire reinforcement member on a helically corrugated mandrel with the coils of the reinforcement member seated in positioning means formed in the crests of the corrugations on the mandrel with portions of the reinforcement member extending beyond the surface of the mandrel, said mandrel being hollow and having passages extending to the corrugated surface thereof, preforming a tubular member comprising a layer of elastomeric material and a layer of fabric material bonded thereto over the mandrel to elastically embrace the corrugated mandrel and reinforcing member thereon, applying suction to the mandrel to draw the composite tubular member into surface contact with the corrugated mandrel and reinforcement member to form a hose body having troughs below the reinforcement member and to mold the inner surface thereof, inserting the mandrel and hose body thereon into the cavity of the mold, the walls of the cavity having complimentary helical corrugations with respect to the hose body, applying fluid pressure to the mandrel internally thereof to cause the hose body to be pressed against the walls of the cavity with molding pressure, and heating the hose body to completely set the hose body to provide a smooth molded surface thereon while simultaneously causing said fabric layer to become embedded within said elastomeric layer.

11. The method according to claim 10 wherein the fabric layer is positioned and bonded externally of said elastomeric layer.

12. The method according to claim 10 wherein the fabric layer is positioned and bonded internally of said elastomeric layer.

13. The method of making fabric reinforced corrugated hose which comprises the steps of positioning a layer of fabric over the surface of a corrugated mandrel, said mandrel being hollow and having passages extending to the corrugated surface thereof, positioning over the fabric layer at the crests of said corrugations in contact therewith a plurality of spaced reinforcing members, applying over said reinforcing members and said fabric layer a layer of uncured elastomeric material, applying suction to the mandrel to draw the elastomeric layer into contact with the reinforcement and fabric to form troughs below the reinforcement means, and subjecting the resultant assembly to curing temperatures while forcing said elastomeric layer into engagement with said fabric and reinforcing members to embed them within said elastomeric layer.

14. The method according to claim 13 wherein the mandrel is provided with flattened areas at the crests of the corrugations to facilitate positioning of said reinforcing members thereover.

15. The method according to claim 13 wherein the reinforcing members are formed of wire covered with a layer of resilient elastomeric material whereby the engagement of said layer with said fabric facilitates positioning of said members at the crests of said corrugations.

References Cited in the file of this patent

UNITED STATES PATENTS

| 1,361,001 | Blaisdell | Dec. 7, 1920 |
| 2,176,762 | Forbes | Oct. 17, 1939 |
| 2,272,704 | Harding | Feb. 10, 1942 |
| 2,273,027 | Dreyer | Feb. 17, 1942 |
| 2,766,806 | Rothermel et al. | Oct. 16, 1956 |
| 2,780,273 | Roberts | Feb. 5, 1957 |
| 2,780,274 | Roberts et al. | Feb. 5, 1957 |
| 2,813,573 | Roberts | Nov. 19, 1957 |
| 2,822,857 | Rothermel et al. | Feb. 11, 1958 |
| 2,825,365 | Meyers et al. | Mar. 4, 1958 |

FOREIGN PATENTS

| 237,823 | Switzerland | Sept. 1, 1945 |
| 651,097 | Great Britain | Mar. 14, 1951 |
| 761,393 | Great Britain | Nov. 14, 1956 |